CIRCUIT CONTROLLER

Filed April 27, 1959 2 Sheets-Sheet 1

INVENTOR
O. D. JACOBSON
BY Edwin B. Cave
ATTORNEY

Feb. 6, 1962 O. D. JACOBSON 3,020,369

CIRCUIT CONTROLLER

Filed April 27, 1959 2 Sheets-Sheet 2

INVENTOR
O. D. JACOBSON
BY Edwin B. Cave
ATTORNEY 3,020,369

CIRCUIT CONTROLLER

Oscar D. Jacobson, Bronx, N.Y., assignor to Bell Telephone Laboratories, Incorporated, New York, N.Y., a corporation of New York Filed Apr. 27, 1959, Ser. No. 809,058
10 Claims. (Cl. 200—104)

Figure 1:
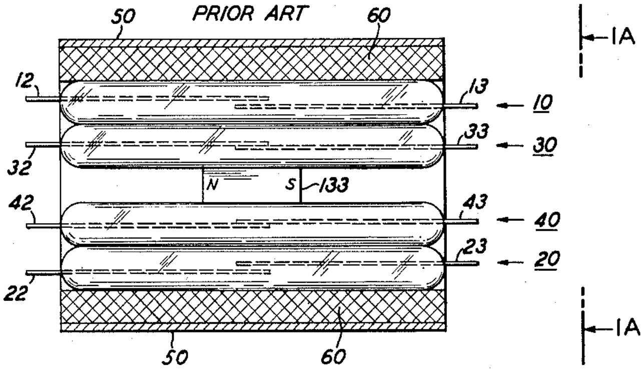

This invention relates, in general, to circuit controlling devices and, in particular, to magnetically operable circuit controllers such as relays and the like.

It is notorious that the operating requirements of many electrical networks include the need for making electrical connections between some circuits and breaking electrical connections between other circuits. Many magnetically operable circuit controlling devices having both normally-open and normally-closed contact members have been devised for performing the aforementioned switching operations. These circuit controlling devices, when operated by magnetic means, disconnect circuits associated with the normally-closed contact members and connect circuits associated with the normally-open contact members. In order to perform these switching operations reliably, it is desirable that such magnetically operable circuit controllers possess, among others, the following characteristics: First, the contact members ought to open and close in a "clean atmosphere"; i.e., relatively free from the deleterious effects of corrosive substances. Second, the circuit controller ought to have a non-marginal magnetic operating characteristic; i.e., the normally-closed contact members should not be susceptible of being falsely reclosed when a magnetic field, perhaps excessive in magnitude, is introduced for the purpose of opening the normally-closed contact members. Third, the magnetic means employed in such circuit controlling devices ought to be relatively free of the need of having their magnetic characteristics readjusted during the useful life of the circuit controller. Fourth, the circuit controlling device ought to have a non-polarized operating characteristic; i.e., the contact members should perform their intended switching functions whether or not the circuit controller's magnetic operating means is, when actuated, magnetically oriented in a specific manner.

The first of the aforementioned characteristics can be achieved by employing hermetically sealed reed switch units of the general type described in the specification of the United States Patent 2,187,115, issued on January 16, 1940, to W. B. Ellwood and W. H. T. Holden. In addition, this switch unit possesses other desirable characteristics: viz., a relatively small amount of power is required to operate it; and, it is relatively rapid in its response.

Where switch units of this type are employed in combination with permanent magnet means for biasing the reeds to a normally-closed status, the danger of falsely reclosing these reeds during the operation of the switch unit is presented. Thus, the second of the aforementioned characteristics is difficult to attain. At FIG. 1 of the accompanying drawings there is shown a magnetically operable circuit controller, or, relay. This relay is, in general, typical of the prior art embodiments of multicontact relays employing normally-open and normally-closed reed switch units. As is indicated, the permanent magnet 133 is employed for biasing the switch units 30 and 40 to a closed status; i.e., the normally-closed status. When sufficient magnetic flux from the coil 60 is introduced into the reeds in opposition to the magnetic flux from the magnet, the closed pairs of reeds in the switch units 30 and 40 will open. If magnetic flux from the coil continues to increase, the danger of falsely reclosing the reeds appears because the dominating influence of the coil's magnetic flux tends to establish unlike magnetic poles at the contacting tips of these opened reeds. Manifestly, it is undesirable if the magnetic margin between the opening of the reeds and the reclosing of the reeds is so narrow that the magnitude of the energization of the coil becomes critical.

With relays of the type shown in the FIG. 1, the third of the aforementioned characteristics is difficult to attain. Since the permanent magnet is located within the core area of the coil, there is a tendency for the magnetization of the permanent magnet 133 to be altered due to the effects of the coil's magnetic field.

Referring again to the relay shown in the FIG. 1, the fourth of the aforementioned characteristics is also difficult to attain with relays of this type. In order to open the normally-closed reeds, the coil 60 must be energized in such manner that the coil's magnetic field is oriented in opposition to the permanent magnet's magnetic field.

Therefore the objects of this invention include: the improvement, structurally and functionally, of magnetically operable circuit controllers; the enabling of reliable switching performance; the achievement of a circuit controller having a non-marginal magnetic operating characteristic; the achievement of a circuit controller having magnetic field producing means that are relatively free of having their magnetic characteristics altered; the achievement of a circuit controller having a non-polarized operating characteristic; and, the achievement of the aforesaid objects with simple, reliable and economical means.

The invention, as illustrated in the accompanying drawings and hereinafter described by specific embodiments, achieves the aforementioned objectives by providing a magnetically operable circuit controller comprising: a first pair of normally-closed contacts; a second pair of normally-open contacts, magnetic field producing means associated with both pairs of contacts and so oriented as to produce, upon energization, like magnetic poles in the normally-closed contacts and unlike magnetic poles in the normally-open contacts whereby the normally-closed contacts are opened and the normally-open contacts are closed.

In accordance with the objectives hereinbefore stated, circuit controllers embodying the invention are hereinafter described and illustrated in the accompanying drawings. In one of the specific embodiments illustrating the invention the magnetic field producing means includes permanent magnet means and electromagnetic means. The permanent magnet means function to bias the first pair of contacts to a normally-closed status. The electromagnetic means function to change the status of both pairs of contacts; i.e., from a normal status to an operated status. The permanent magnet means are situated and magnetically oriented relative to the electromagnetic means so that the permanent magnet means are virtually isolated from the magnetic influence of the electromagnetic means. Thus, a circuit controller having the following features is achieved: the circuit controller has a non-marginal magnetic operating characteristic; and, the magnetization of the permanent magnet means is unaltered by the influence of the electromagnetic means.

In another of the specific embodiments of the invention, the electromagnetic means is comprised of a pair of coils; one coil encompassing the normally-open and the normally-closed contacts; another coil encompassing the normally-closed contacts. When both coils are energized they produce mutually opposing magnetic fields whereby the normally-closed contacts are opened and the normally-open contacts are closed. As a consequence, the magnetic fields produced by the coils need not have a predetermined orientation in relation to the permanent magnet means in order to cause the circuit controller to perform its intended function.

Other objects and features, as well as a fuller understanding of the invention, will become apparent by referring to the following description and claims, taken in conjunction with the accompanying drawings. The drawings, having the figures hereinafter indicated, serve to illustrate specific embodiments of the invention.

FIG. 1 shows a cross-sectional view of a relay having both normally-open contacts and normally-closed contacts, the normally-closed contacts being separated contacts which are biased to a closed status by a permanent magnet, and a coil operable to produce a magnetic field in opposition to the permanent magnet's field for closing the normally-open contacts and opening the normally-closed contacts. This relay, not being an embodiment of the invention, is shown for the purpose of illustrating the discussion, hereinbefore set forth, relating to: marginal magnetic operating characteristics; magnetically polarized operating characteristics; and, the susceptibility of the permanent magnet to being demagnetized.

Figure 1A:
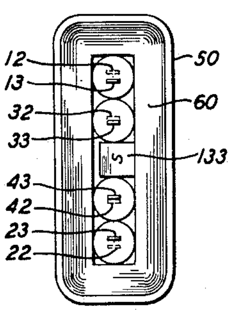

FIG. 1A is an end view, taken along the lines 1A—1A, of the relay shown in FIG. 1.

Figure 2:
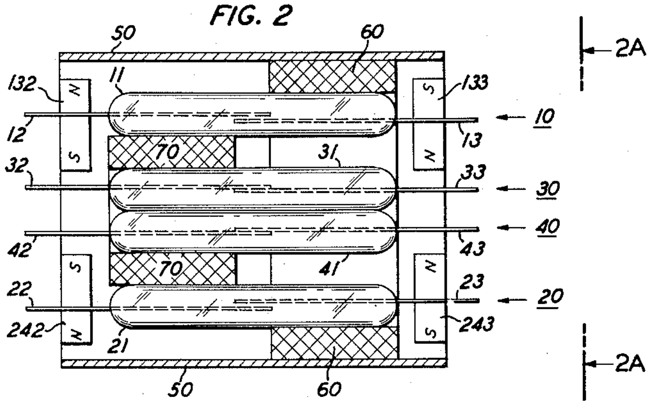

FIG. 2 shows a cross-sectional view of a relay which is a specific embodiment of the invention. A pair of permanent magnets is provided for biasing each of the normally closed contacts. This relay has magnetically non-marginal and magnetically non-polarized operating characteristics. In addition, the permanent magnets are not susceptible of being demagnetized.

Figure 2A:
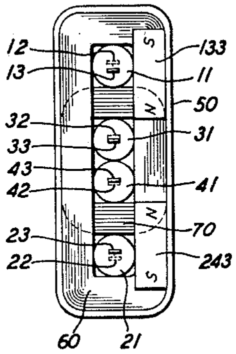

FIG. 2A is an end view, taken along the lines 2A—2A, of the relay shown in FIG. 2.

Figure 3:
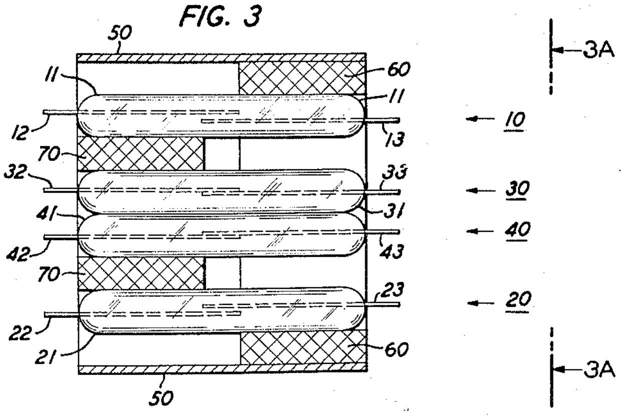

FIG. 3 shows a cross-sectional view of another embodiment of the invention similar to the relay of FIG. 2. Mechanical biasing means are employed in this modification. This relay has the same operating characteristics as the relay of FIG. 2. There is no demagnetization problem.

Figure 3A:
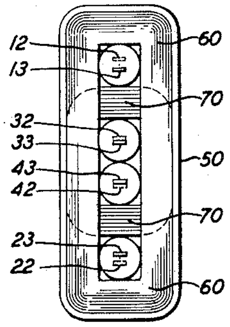

FIG. 3A is an end view, taken along the lines 3A—3A, of the relay shown in FIG. 3.

Figure 4:
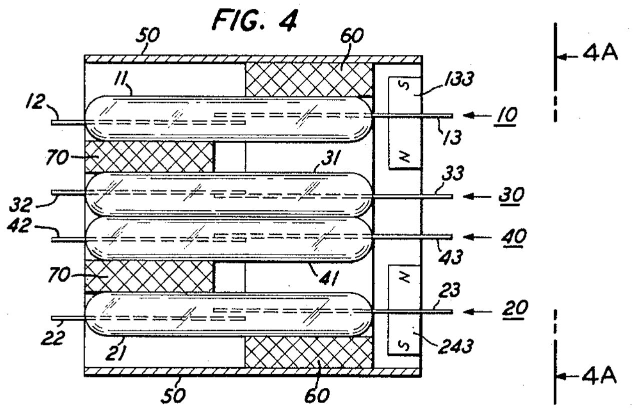

FIG. 4 shows a cross-sectional view of another embodiment of the invention. A permanent magnet is provided for biasing each of the normally-closed contacts. This relay has the same operating characteristics as the rely of FIG. 2. In addition, the permanent magnets are not susceptible of being demagnetized.

Figure 4A:
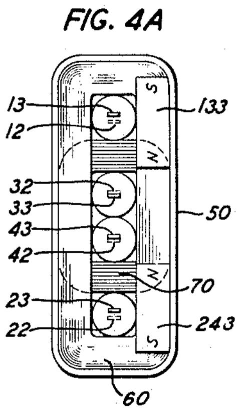

FIG. 4A is an end view, taken along the lines 4A—4A, of the relay shown in FIG. 4.

Figure 5:
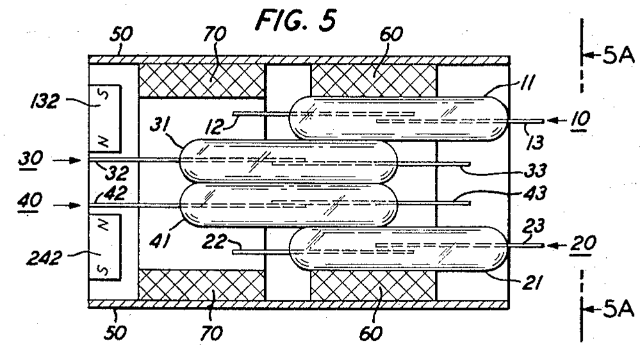

FIG. 5 shows a cross-sectional view of another embodiment of the invention. This relay has the same operating characteristics as the relay of FIG. 2. In addition, the permanent magnets are not susceptible of being demagnetized.

Figure 5A:
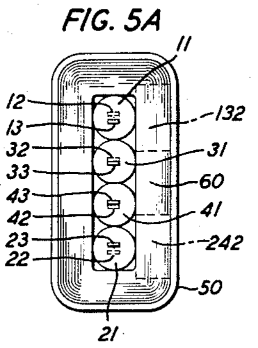

FIG. 5A is an end view, taken along the lines 5A—5A, of the relay shown in FIG. 5.

Figures 6, 6A:
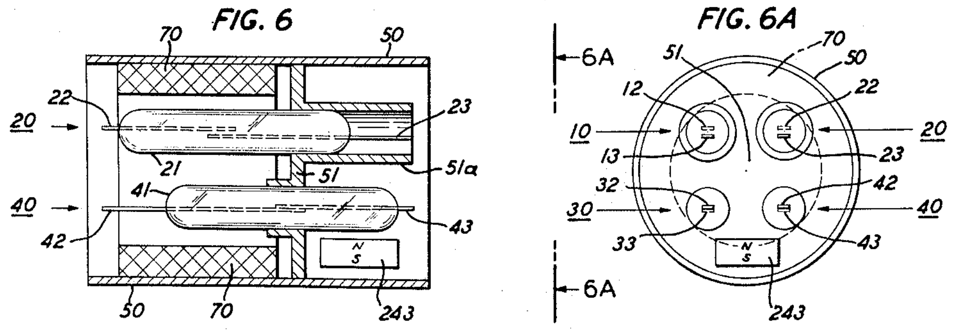

FIG. 6 shows a cross-sectional view of another embodiment of the invention. This relay has both normally-open contacts and normally-closed contacts, the normally-closed contacts being separated contacts which are biased to a closed status by a permanent magnet. A coil, when energized, operates to close the normally-open contacts and open the normally-closed contacts. The permanent magnet is isolated from the coil by shielding means. Although this relay has a polarized operating characteristic, it has a non-marginal magnetic operating characteristic and the permanent magnet is not susceptible of being demagnetized by the coil's magnetic field.

FIG. 6A is an end view, taken along the lines 6A—6A, of the relay shown in FIG. 6.

The relay illustrated in the FIGS. 2 and 2A is comprised of the four switch units designated, generally, by the reference characters 10, 20, 30 and 40. Two coils, 60 and 70, are associated with this group of switch units. All of the switch units are disposed within the core area of the coil 60; and, only the switch units 30 and 40 are disposed within the core area of the coil 70. Four permanent magnets are included in the relay: the magnets 132 and 133 being associated with the switch units 10 and 30; and, the magnets 242 and 243 being associated with the switch units 20 and 40. A casing 50, of magnetizable material, encloses the coils, the magnets and the switch units.

Each of the switch units is of the type disclosed in the specification and drawings of the previously-noted Patent 2,187,115 to W. B. Ellwood and W. H. T. Holden. In brief, this type of switch unit is one wherein a pair of magnetizable reeds is enclosed within a non-magnetizable envelope; for example, soft-iron reeds within a glass envelope. The switch unit 10 includes, within the envelope 11, the reeds 12 and 13. The switch units 20, 30 and 40 are similarly constructed including, respectively, the reeds 22—23, 32—33 and 42—43 within the envelopes 21, 31 and 41. As is indicated in FIG. 2, the reeds 13, 23, 33 and 43 of the switch units 10, 20, 30 and 40, respectively, are disposed within the core area of the coil 60, and, the reeds 32 and 42 of the switch units 30 and 40, respectively, are disposed within the core area of the coil 70. In the absence of any magnetic field, or, in the presence of a sufficiently weak magnetic field, the reeds of each switch unit are separated from each other. Nevertheless, the reeds of the switch units 30 and 40, respectively, are in contact with each other due to the biasing effect of the permanent magnets 132, 133, 242, and 243. As is discussed hereinafter, the permanent magnets are incorporated into the relay in such a manner that the switch units 10 and 20 are open whilst the switch units 30 and 40 are closed.

Relative to the coils 60 and 70 and relative to the switch units 10, 20, 30 and 40, the permanent magnets are spatially situated and magnetically oriented as shown in the FIGS. 2 and 2A. The letters N and S designate the "north pole" and the "south pole," respectively, of each permanent magnet. For convenience, these poles are, hereinafter referred to as the N-pole and the S-pole. Each of the permanent magnets is situated outside the core areas of the coils 60 and 70 and each permanent magnet's magnetic field is oriented crosswise to the magnetic fields produced by the coils. Relative to the switch units, each permanent magnet is situated and magnetically oriented with respect to two of the switch units so that one of the switch units is magnetically biased to a closed status. The purposes served by the spatial and magnetic relationships of the permanent magnets to the coils and the switch units will become apparent hereinafter when the operational features of the relay are discussed.

The spatial and magnetic relationships among the permanent magnets and the switch units are shown in the FIGS. 2 and 2A. The N-pole of the permanent magnet 133 and the S-pole of the permanent magnet 132 are positioned adjacent to the ends of the reeds 33 and 32, respectively, whereby unlike magnetic poles are created at the overlapping portions of these reeds within the switch unit 30. Thus, the reeds 32 and 33, being serially arranged in a magnetic circuit including the permanent magnets 132 and 133 and the casing 50, are caused to move into contact with each other thereby causing the switch unit 30 to assume a closed status. However, the longitudinal axes of the reeds 12 and 13 of the switch unit 10 are disposed crosswise of the mid-portions of the longitudinal axes of the permanent magnets 132 and 133, respectively. Thus, the reeds 12 and 13 are not subjected to a magnetic potential of sufficient strength to cause these reeds to move into contact with each other. Therefore, the switch unit 10 remains in an open status. The permanent magnets 242 and 243 influence the switch units 20 and 40 in the same manner as the permanent magnets 132 and 133 influence the switch units 10 and 30, and are positioned and oriented as shown in the FIGS. 2 and 2A.

The relay, as shown in the FIGS. 2 and 2A, is in its normal condition; i.e., the switch units 10 and 20 are in the open status and the switch units 30 and 40 are in the closed status. The relay remains in its normal condition as long as the coils 60 and 70 are not energized. When the coils 60 and 70 are energized with a current of sufficient magnitude, simultaneously, so that each coil produces a magnetic field which is oriented in opposition to the magnetic field produced by the other coil, the relay assumes an operated condition; i.e., the switch units 10 and 20 assume a closed status and the switch units 30 and 40 assume an open status. In order to cause the coils 60 and 70 to produce mutually opposing magnetic fields, these coils are, in accordance with well-known principles, opposingly wound and serially connected.

Assuming that the coils 60 and 70 are energized as aforesaid, the magnetic field produced by each coil is directed along the reeds, encompassed by the particular coil, toward the contacting portions of these reeds. The creation of unlike magnetic poles at the contacting portions of the reeds 12—13 and 22—23 by coil-flux from the coil 60 causes these reeds to move into contact with each other whereby the switch units 10 and 20 assume a closed status. Coil-flux from the coil 70 opposes coil-flux from the coil 60 and thereby like magnetic poles are created at the contacting portions of the reeds 32 and 33 of the switch unit 30; and at the contacting portions of the reeds 42 and 43 of the switch unit 40. Therefore, the switch units 30 and 40 are caused to be changed from a closed status to an open status.

Among the operating features that characterize the relay shown in the FIGS. 2 and 2A are the following: First, the relay has a non-marginal magnetic operating characteristic; i.e., the normally-closed switch units 30 and 40, are not susceptible of being falsely reclosed due to the influence of coil-flux. Since the coils 60 and 70 are electrically connected to produce mutually opposing magnetic fields, an increasing current through the coils causes the contacting portions of the reeds in the switch units 30 and 40, respectively, to magnetically repel each other with correspondingly greater force. As a consequence, coil-flux causes positive opening of the reeds in the normally-closed switch units rather than an unwanted subsequent reclosure of the reeds. Second, the magnetization of each of the permanent magnets is substantially unaltered by the influence of coil-flux; i.e., neither the fixed magnetomotive force nor the magnetic polarization of any of the permanent magnets is disturbed. As a consequence, the relay's magnetic characteristics do not become critically changed due to continued, or, repeated, operations of the relay. Since each of the permanent magnets is situated outside the core areas of the coils and since each permanent magnet's magnetic field is oriented crosswise to the orientation of the magnetic fields produced by the coils, the magnets are effectively isolated from the otherwise dominant influence of the coils' magnetic fields. Furthermore, the magnetic fields produced by the coils tend to cancel each other since these fields are in a mutually opposing relationship. Third, the relay has a non-polarized operating characteristic; i.e., since the magnetic field produced by the coils are in mutual opposition, there are no restrictions as to a defined coil-flux orientation relative to permanent magnet-flux orientation. Accordingly, the direction of current through the windings of the coils is immaterial.

Referring now to the FIGS. 3 and 3A, the relay there illustrated has the same operating features as the relay shown in the FIGS. 2 and 2A; i.e., it has a non-marginal magnetic operating characteristic; there is no problem regarding the alteration of the magnetization of permanent magnets since permanent magnets are not used; and, it has a non-polarized operating characteristic. As is shown in the FIGS. 3 and 3A, the relay there illustrated is somewhat similar to the relay shown in the FIGS. 2 and 2A. For convenience, like reference characters are employed to designate elements common to both of these relays. Structurally, the relay of FIG. 3 is unlike the relay of FIG. 2 in the following respects: permanent magnets are not employed in the FIG. 3 relay; and, the switch units 30 and 40 of the FIG. 3 relay are in a normally-closed status because the reeds 32 and 33, of the switch unit 30, and the reeds 42 and 43, of the switch unit 40, are aligned within the envelopes 31 and 41, respectively, so that they are in contact.

As is illustrated in the FIGS. 3 and 3A, the relay is in its normal condition; i.e., the switch units 10 and 20 are in the open status and the switch units 30 and 40 are in a closed status. The relay remains in its normal condition as long as the coils 60 and 70 are not energized. When the coils 60 and 70 are energized, simultaneously, with current of sufficient magnitude so that each coil produces a magnetic field which is oriented in opposition to the magnetic field produced by the other coil, the relay assumes an operated condition; i.e., the switch units 10 and 20 assume a closed status and the switch units 30 and 40 assume an open status.

Referring now to the FIGS. 4 and 4A, the relay there illustrated is similar to the relay of FIG. 2 except that the permanent magnets 132 and 242, employed in the relay of FIG. 2, are not employed in the relay of FIG. 4. The relay shown in the FIGS. 4 and 4A has the same operating features as the relay shown in the FIGS. 2 and 2A; i.e., it has a non-marginal magnetic operating characteristic, the magnetization of each of the permanent magnets is unalterable because the magnets are spatially and magnetically oriented in the same manner as hereinbefore described for the relay of FIG. 2, and the relay is non-polarized in the sense that the relay can be operated without regard for the direction of current flow through the windings of the coils 60 and 70.

Referring now to the relay shown in the FIGS. 5 and 5A, the relay there illustrated is similar to the relay shown in the FIGS. 4 and 4A but with a modified arrangement of coils and switch units. A comparison between the relay of FIG. 5 and the relay of FIG. 4 will indicate that: in the relay of FIG. 5, the reeds within the switch units 10 and 20 are disposed within the core area of the coil 60; and, in the relay of FIG. 5 the switch gap regions of the switch units 30 and 40 are located in the space between the ends of the coils 60 and 70. As a consequence, the energization of the coils 60 and 70 in the manner hereinbefore discussed tends to cause the closure of the switch units 10 and 20 before the switch units 30 and 40 are opened.

The relay shown in the FIGS. 5 and 5A has the same operating features as the relay shown in the FIGS. 2 and 2A; i.e., it has a non-marginal magnetic operating characteristic; the magnetization of the permanent magnets 132 and 242 is substantially unalterable because the magnets are spatially and magnetically oriented in the same manner as hereinbefore described for the relay shown in FIG. 2; and, the relay is non-polarized in the sense that the relay can be operated regardless of the direction of the current through the windings of the coils 60 and 70.

The relay shown in the FIGS. 6 and 6A is comprised of the four switch units designated, generally, by the reference characters 10, 20, 30 and 40. One coil, 70, is included in the relay. All of the switch units are disposed within the coil 70. A permanent magnet 243 is associated with the switch units 30 and 40 as indicated in the FIGS. 6 and 6A. A casing 50, of magnetizable material, encloses the coil 70 and all of the switch units. A shielding member 51, of magnetizable material, having apertures therein for receiving each of the switch units is positioned, as indicated in the FIGS. 6 and 6A, within the casing 50. The magnetizable tubulations *51a*, integrally connected with the shielding member 51, are provided for magnetically shielding the switch units 10 and 20 from the magnetic influence of the permanent magnet 243.

Each of the switch units is of the same type as used in the relay shown in FIG. 2. The switch unit 10 includes, within the envelope 11, the reeds 12 and 13. The switch units 20, 30 and 40 are similarly constructed including respectively the reeds 22—23, 32—33 and 42—43 within the envelopes 21, 31 and 41. In the absence of any magnetic field, or, in the presence of a sufficiently weak magnetic field, the reeds of each switch unit are separated from each other. Nevertheless, the reeds within the switch units 30 and 40 are in contact due to the biasing effect of the permanent magnet 243. The relay, as shown in the FIGS. 6 and 6A, is in its normal condition; i.e., the switch units 10 and 20 are in the open status and the switch units 30 and 40 are in the closed status. The relay remains in its normal condition as long as the coil 70 produces no magnetic field or produces a sufficiently weak magnetic field. Assuming that the coil 70 is energized to produce a coil-flux that is directed along the reeds of the switch units 10, 20, 30 and 40, the switch unit 20 will assume a closed status and the switch unit 40 will assume an open status. Similarly, the switch unit 10 will assume a closed status and the switch unit 30 will assume an open status. The switch units 30 and 40 assume an open status because coil-flux is oriented in opposition to magnet-flux from the permanent magnet whereby like magnetic poles are created at the overlapping portions of the reeds of these switch units.

Among the operating features that characterize the relay shown in the FIGS. 6 and 6A are the following: First, the relay has a non-marginal magnetic operating characteristic; and, second, the permanent magnet's magnetization is not altered by the influence of coil-flux because the magnet is shielded from the coil-flux by the shielding member 51 and, in addition, the magnet's field is oriented crosswise to the field of the coil.

Advantageously, the relay structure shown in the FIGS. 6 and 6A is easily modified to provide a latching type of relay. All that is required is the elimination of the switch units 10 and 20; and, the substitution of a weaker permanent magnet. The weaker permanent magnet allows the switch units 30 and 40 to become normally-open switch units. A momentary energization of the coil 70 closes these switch units and the permanent magnet will cause them to become latched in the closed status. A reversal of coil current is all that is needed to reopen these switch units and they will not reclose even though the coil is over-energized.

Although the invention has been described in various embodiments thereof, it is to be understood that the present disclosure is for the purpose of illustrating the invention and that numerous changes in the details of construction, in the combination and arrangement of elements can be made without departing from the spirit and scope of the invention as is hereinafter claimed.

What is claimed is:

1. A circuit controller comprising a first pair of spaced-apart magnetizable contacts, a second pair of spaced-apart magnetizable contacts, a permanent source of magnetic energy for maintaining unlike magnetic poles between the contacts of the first pair of contacts in order to hold these contacts together, and an additional source of magnetic energy operable for superposing like magnetic poles between the contacts of the first pair of contacts in order to nullify the holding effect of the permanent magnetic source thereon and for creating unlike magnetic poles between the contacts of the second pair of contacts in order to move these contacts into mutual engagement, and a magnetizable member interposed between the additional source and the permanent source for preventing the additional source's energy from critically altering the magnetization of the permanent source.

2. A circuit controlling device comprising a first pair of magnetizable reeds arranged in a spaced-apart overlapping relationship, a second pair of magnetizable reeds arranged in a spaced-apart overlapping relationship, permanent magnet means associated with the first pair of reeds for magnetically biasing the first pair of reeds to a closed status, second magnetic field producing means operable to reopen the first pair of reeds and to close the second pair of reeds, and magnetic shielding means for preventing the magnetic field produced by the second magnetic field producing means from demagnetizing the permanent magnet means.

3. A circuit controlling device as is defined in claim 2 wherein the permanent magnet means produces a magnetic field which is oriented crosswise to the direction of the magnetic field produced by the second magnetic field producing means.

4. A circuit controlling device comprising a first pair of magnetizable reeds arranged in a spaced-apart overlapping relationship, a second pair of magnetizable reeds arranged in a spaced-apart overlapping relationship, permanent magnet means associated with the first pair of reeds for magnetically biasing the first pair of reeds to a closed status, and second magnetic field producing means operable to reopen the first pair of reeds and to cause the second pair of reeds to assume a closed status; said second magnetic field producing means comprising first and second coils, the first coil encompassing the first and second pairs of reeds, the second coil encompassing only the first pair of reeds, whereby the simultaneous energization of both coils creates unlike magnetic poles between the overlapping portions of the second pair of reeds and like magnetic poles between the overlapping portions of the first pair of reeds thereby causing the first pair of reeds to assume an open status and the second pair of reeds to assume a closed status.

5. A circuit controlling device as is defined in claim 4 wherein the permanent magnet means produces a magnetic field which is oriented crosswise to the direction of the magnetic fields produced by the first and second coils.

6. A circuit controlling device comprising a first pair of magnetizable reeds arranged in a spaced-apart overlapping relationship, a second pair of magnetizable reeds arranged in a spaced-apart overlapping relationship, permanent magnet means associated with the first pair of reeds for magnetically biasing the first pair of reeds to a closed status, and second magnetic field producing means operable to reopen the first pair of reeds and to cause the second pair of reeds to assume a closed status; said second magnetic field producing means comprising a first coil surrounding the first and second pairs of reeds, a second coil surrounding the first pair of reeds only, the first and second coils being opposingly wound and serially connected; said permanent magnet means comprising a first permanent magnet and a second permanent magnet, the first permanent magnet being situated remote from the overlapping portions of the first pair of reeds and positioned proximate to an extremity of one of the reeds of the first pair of reeds, the magnetic field of the first permanent magnet being oriented crosswise to the direction of the magnetic fields produced by the first and second coils, and the second permanent magnet being situated remote from the overlapping portions of the first pair of reeds and positioned proximate to an extremity of the other of the reeds of the first pair of reeds, the magnetic field of the second permanent magnet being oriented crosswise to the direction of the magnetic fields produced by the first and second coils.

7. A circuit controller comprising a first pair of normally-closed reed contacts, a second pair of normally-open reed contacts, and control means including permanent magnet means and electromagnetic means, the permanent magnet means biasing the first pair of contacts to a normally-closed status, the electromagnetic means, when energized, producing a magnetic field which is oriented crosswise of the permanent magnet means' internal magnetic field, the reed contacts and said control means being so oriented and positioned in relation to each other that the electromagnetic means' magnetic field opens the normally-closed contacts and closes the normally-open contacts.

8. A circuit controller comprising first, second, third and fourth pairs of magnetizable reeds, each pair of reeds being arranged in spaced-apart overlapping relationship and adaptable of being flexed so that the overlapping portions of each pair of reeds make mutual contact, a first bar-type permanent magnet associated with the first and second pairs of reeds, a second bar-type permanent magnet associated with the third and fourth pairs of reeds, the first magnet being remotely situated from the overlapping portions of the first and second pairs of reeds and so arranged that its longitudinal axis is crosswise of the longitudinal axes of the reeds of the first and second pairs of reeds, one extremity of the first magnet being proximate to one reed of the second pair of reeds and an extremity of one reed of the first pair of reeds being proximate to the mid-point of the first magnet's longitudinal axis, the second magnet being remotely situated from the overlapping portions of the third and fourth pairs of reeds and so arranged that its longitudinal axis is crosswise of the longitudinal axes of the reeds of the third and fourth pairs of reeds, one extremity of the second magnet being proximate to one reed of the third pair of reeds and an extremity of one reed of the fourth pair of reeds being proximate to the mid-point of the second magnet's longitudinal axis, the first magnet being effective to cause the overlapping portions of the second pair of reeds to be maintained in mutual contact and the second magnet being effective to cause the overlapping portions of the third pair of reeds to be maintained in mutual contact, a first coil surrounding one of the reeds of each of the four pairs of reeds, and a second coil surrounding one of the reeds of each of the second and third pairs of reeds, the first and second coils, when simultaneously energized, being effective to cause the overlapping portions of first and fourth pairs of reeds, respectively, to make mutual contact and to cause the overlapping portions of the second and third pairs of reeds, respectively, to become mutually spaced-apart.

9. A circuit controller comprising first and second pairs of magnetizable reeds, the first pair of reeds being arranged in spaced-apart overlapping relationship and adaptable of being flexed so that their overlapping portions make mutual contact, the second pair of reeds being arranged in an overlapping relationship such that their overlapping portions are in mutual contact and adaptable of being flexed so that their overlapping portions become spaced-apart, a first coil surrounding one reed of each of the first and second pairs of reeds, and a second coil surrounding one reed of the second pair of reeds, the first and second coils, when energized simultaneously, creating like magnetic poles at the overlapping portions of the first pair of reeds and unlike magnetic poles at the overlapping portions of the second pair of reeds whereby said pairs of reeds become flexed causing the first pair of reeds to make mutual contact and the second pair of reeds to become spaced apart.

10. A circuit controller comprising first and second pairs of magnetizable reeds, each pair of reeds being arranged in spaced-apart overlapping relationship and adaptable of being flexed so that the overlapping portions of each pair of reeds make mutual contact, a bar-type permanent magnet associated with both pairs of reeds, the magnet being remotely situated from the overlapping portions of both pairs of reeds and so arranged that its longitudinal axis is crosswise of the longitudinal axes of the reeds of both pairs of reeds, one extremity of the magnet being proximate to one reed of the first pair of reeds and an extremity of one reed of the second pair of reeds being proximate to the mid-point of the magnet's longitudinal axis, the magnet being effective to cause the overlapping portions of the first pair of reeds to be maintained in mutual contact, a first coil surrounding one of the reeds of each of the two pairs of reeds, and a second coil surrounding one of the reeds of the first pair of reeds, the first and second coils, when energized simultaneously, being effective to cause the overlapping portions of the first pair of reeds to become spaced-apart and to cause the overlapping portions of the second pair of reeds to move into mutual contact.

References Cited in the file of this patent

UNITED STATES PATENTS

| | | |
|---|---|---|
| 2,187,115 | Ellwood | Jan. 16, 1940 |
| 2,609,464 | Brown et al. | Sept. 2, 1952 |
| 2,821,597 | Germanton et al. | Jan. 28, 1958 |
| 2,877,316 | Peek | Mar. 10, 1959 |
| 2,902,558 | Peek | Sept. 1, 1959 |